(12) United States Patent
Suzuki et al.

(10) Patent No.: US 9,393,849 B2
(45) Date of Patent: Jul. 19, 2016

(54) VEHICLE HEIGHT ADJUSTMENT APPARATUS

(71) Applicant: AISIN SEIKI KABUSHIKI KAISHA, Kariya (JP)

(72) Inventors: Takanori Suzuki, Nisshin (JP); Atsuto Ogino, Chiryu (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 14/548,751

(22) Filed: Nov. 20, 2014

(65) Prior Publication Data
US 2015/0151600 A1 Jun. 4, 2015

(30) Foreign Application Priority Data

Nov. 29, 2013 (JP) ................... 2013-247945

(51) Int. Cl.
*B60G 17/015* (2006.01)
*B60G 17/017* (2006.01)
*B60G 17/052* (2006.01)
(Continued)

(52) U.S. Cl.
CPC .............. *B60G 17/015* (2013.01); *B60G 11/27* (2013.01); *B60G 17/017* (2013.01); *B60G 17/0525* (2013.01); *B60G 17/0565* (2013.01); *B60G 2202/152* (2013.01); *B60G 2400/252* (2013.01); *B60G 2400/90* (2013.01);
(Continued)

(58) Field of Classification Search
CPC ............. B60G 17/0525; B60G 17/017; B60G 17/0565; B60G 2500/2021; B60G 2500/30; B60G 2400/252; B60G 2800/20; B60G 2400/90; B60G 2500/202; B60G 2202/152
See application file for complete search history.

(56) References Cited

U.S. PATENT DOCUMENTS

| 5,452,919 A | 9/1995 | Hoyle et al. |
| 6,282,470 B1 * | 8/2001 | Shono ................. B60G 17/015 180/41 |
| 2002/0136645 A1 | 9/2002 | Folchert et al. |
| 2006/0142916 A1 | 6/2006 | Onuma et al. |

(Continued)

FOREIGN PATENT DOCUMENTS

| EP | 1 693 234 A2 | 8/2006 |
| JP | 56-86808 A | 7/1981 |
| JP | 2006-341665 | 12/2006 |
| WO | WO 93/05970 A1 | 4/1993 |

OTHER PUBLICATIONS

Extended European Search Report issued May 29, 2015 in Patent Application No. 14194348.0.

*Primary Examiner* — Faye M Fleming
(74) *Attorney, Agent, or Firm* — Oblon, McClelland, Maier & Neustadt, L.L.P.

(57) ABSTRACT

A vehicle height adjustment apparatus includes: vehicle height adjustment units respectively provided to correspond to wheels of a vehicle body, and adjusting a vehicle height in response to the supply and discharge of a working fluid; a supply source of the working fluid; opening and closing valves interposed between the vehicle height adjustment units and the supply source; and a control unit adjusting the vehicle height for the vehicle height adjustment unit in a storage vehicle height range which is present within a vehicle height adjustable range of the vehicle height adjustment unit, and is set to be lower than a center value of a travelling vehicle height range attainable while travelling, wherein when a predetermined vehicle stop condition is satisfied, the control unit adjusts the vehicle height for the vehicle height adjustment unit to any position in the storage vehicle height range.

8 Claims, 6 Drawing Sheets

(51) Int. Cl.
*B60G 17/056* (2006.01)
*B60G 11/27* (2006.01)

(52) U.S. Cl.
CPC .. *B60G 2500/202* (2013.01); *B60G 2500/2021* (2013.01); *B60G 2500/30* (2013.01); *B60G 2800/20* (2013.01)

(56) References Cited

U.S. PATENT DOCUMENTS

2006/0186728 A1\* 8/2006 Mizuta ............... B60G 17/0152
   303/3
2006/0284388 A1  12/2006 Nakashima et al.

\* cited by examiner

TIMING CHART

VEHICLE HEIGHT ADJUSTMENT APPARATUS

CROSS REFERENCE TO RELATED APPLICATIONS

This application is based on and claims priority under 35 U.S.C. §119 to Japanese Patent Application 2013-247945, filed on Nov. 29, 2013, the entire contents of which are incorporated herein by reference.

TECHNICAL FIELD

This disclosure relates to a vehicle height adjustment apparatus.

BACKGROUND DISCUSSION

In the related art, there is provided a vehicle equipped with a suspension that includes air springs using compressed air and the like. There is also a vehicle equipped with a vehicle height adjustment apparatus using the air springs. There is a so-called closed type vehicle height adjustment apparatus. This type of vehicle height adjustment apparatus increases a vehicle height by supplying high-pressure air stored in a pressure tank to the air springs that change a suspension state of each wheel. The vehicle height adjustment apparatus decreases the vehicle height by discharging the high-pressure air from the air springs and returning the high-pressure air back to the pressure tank. When a passenger boards a vehicle or loads luggage onto the vehicle, a certain type of vehicle height adjustment apparatus using the air springs may receive an ID code transmitted from a portable device of the passenger, and authenticate the ID code with the vehicle. When the ID code is authenticated, the vehicle height adjustment apparatus decreases the vehicle height so as to facilitate the boarding of the passenger and the loading of the luggage. JP 2006-341665A is an example of the related art.

In the related art, vehicle height is adjusted when a passenger is in a vehicle or is about to board the vehicle. However, the inventor concludes that it is possible to broaden the useable range of the vehicle height adjustment apparatus and improve the added value of the vehicle in a case where the vehicle height adjustment apparatus can be used even when a vehicle is not travelling or a passenger moves away from the vehicle.

SUMMARY

Thus, a need exists for a new vehicle height adjustment apparatus which is not suspectable to the drawback mentioned above.

An aspect of this disclosure is directed to a vehicle height adjustment apparatus including: a plurality of vehicle height adjustment units that are respectively provided to correspond to wheels of a vehicle body, and adjust a vehicle height in response to the supply and discharge of a working fluid; a supply source of the working fluid; a plurality of opening and closing valves that are interposed between the vehicle height adjustment units and the supply source; and a control unit that adjusts the vehicle height for the vehicle height adjustment unit in a storage vehicle height range which is present within a vehicle height adjustable range of the vehicle height adjustment unit, and is set to be lower than a center value of a travelling vehicle height range attainable while travelling. When a predetermined vehicle stop condition is satisfied, the control unit adjusts the vehicle height for the vehicle height adjustment unit to any position in the storage vehicle height range. According to this embodiment, after a vehicle is stopped, the vehicle height adjustment apparatus adjusts the vehicle height to any position in the storage vehicle height range that is set to be lower than the center value of the travelling vehicle height range. It is possible to make the vehicle at stop attractive, and prevent the theft of the wheels or the theft of the vehicle by decreasing the vehicle height. As a result, it is possible to broaden the useable range of the vehicle height adjustment apparatus, and improve the added value of the vehicle.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an exemplary embodiment of this disclosure will be disclosed. The configuration of the embodiment illustrated hereinafter, and the action and result (effects) brought by the configuration are only an example. This disclosure can be realized using configurations other than the configuration disclosed in the following embodiment, and various effects (including secondary effects as well) can be obtained by a basic configuration.

Figure 1:
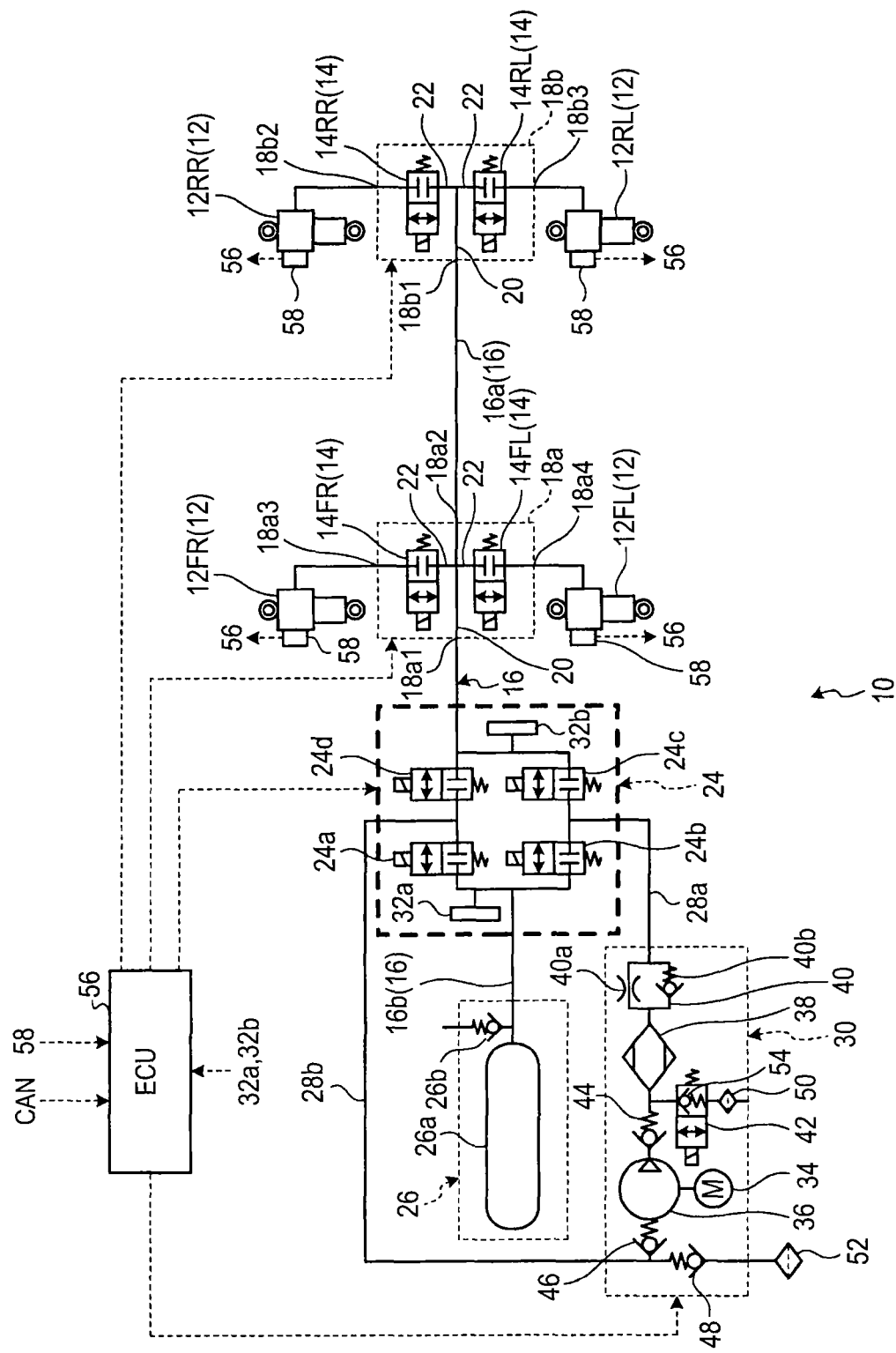
FIG. 1 is a diagram illustrating the configuration of a vehicle height adjustment apparatus according to an embodiment, and illustrates a non-flowing state of a working fluid.

FIG. 1 is a diagram illustrating the configuration of a vehicle height adjustment apparatus 10 according to the embodiment, and illustrates a non-flowing state of a working fluid.

Air springs 12FR, 12FL, 12RR, 12RL (hereinafter, also simply referred to as an "air spring 12" when it is not necessary to distinguish the air springs 12FR, 12FL, 12RR, 12RL therebetween) are respectively connected to the wheels of a vehicle which are not illustrated, and function as vehicle height adjustment units. When the working fluid (for example, air) is supplied to or discharged from the air spring 12, the air spring 12 changes a suspension state of the wheel with respect to a vehicle body of the vehicle. The air spring 12 absorbs the vibration of the vehicle, using the elasticity of compressed air sealed in the air spring 12. The air springs 12FR and 12FL may be referred to as front vehicle height adjustment units. The air springs 12RR and 12RL may be referred to as rear vehicle height adjustment units. A well-known structure can be used in the air spring 12. The air spring 12 absorbs tiny vibrations better than a metallic spring because the air spring 12 uses the elasticity of air. It is possible to maintain a constant vehicle height, adjust the vehicle height to a desired height, or change a spring constant to a desired value by controlling air pressure.

The air springs 12FR and 12FL which are the front vehicle height adjustment units are connected to a main flow passage 16 via respective vehicle height adjustment valves 14FR and 14FL, with the working fluid flowing through the main flow passage 16. Similarly, the air springs 12RR and 12RL which are the rear vehicle height adjustment units are connected to the main flow passage 16 via respective vehicle height adjustment valves 14RR and 14RL, with the working fluid flowing through the main flow passage 16. The vehicle height adjustment valves 14FR, 14FL, 14RR, and 14RL may be simply referred to as a "vehicle height adjustment valve 14" when it is not necessary to distinguish the vehicle height adjustment valves 14FR, 14FL, 14RR, and 14RL therebetween. In the embodiment, the air spring 12 and the vehicle height adjustment valve 14 may be collectively referred to as a vehicle height adjustment unit.

In the embodiment, the vehicle height adjustment valves 14FR and 14FL are disposed by being embedded in a flow passage block made of metal, resin, or the like, and form a front wheel valve unit 18a. Similarly, the vehicle height adjustment valves 14RR and 14RL are disposed being by embedded in the flow passage block, and form a rear wheel valve unit 18b. In another embodiment, the vehicle height adjustment valves 14 may be disposed separately from each other. In this case, the degree of freedom in the layout of the vehicle height adjustment valve 14 improves. The four vehicle height adjustment valves 14 may be integrated into one unit. In this case it is possible to reduce the number of components by integrating the four vehicle height adjustment valves 14 into one unit.

As illustrated in FIG. 1, each of the front wheel valve unit 18a and the rear wheel valve unit 18b is formed as a separate unit, and the front wheel valve unit 18a can be disposed close to the front wheels. As a result, it is possible to reduce the length of a flow passage tube disposed from the front wheel valve unit 18a to each of the respective air springs 12 of the front wheels, compared to when the entirety of the vehicle height adjustment valves 14 are integrated into one unit. Similarly, it is possible to dispose the rear wheel valve unit 18b close to the rear wheels, and reduce the length of a flow passage tube disposed from the rear wheel valve unit 18b to each of the respective air springs 12 of the rear wheels, compared to when the entirety of the vehicle height adjustment valves 14 are integrated into one unit. As a result, it is possible to facilitate the routing of the flow passage tubes, and reduce a potential risk such as damage of the flow passage tubes by reducing the length of the flow passage tubes.

A first port 18a1 is formed in one end surface of the front wheel valve unit 18a, and is connected to the main flow passage 16, and a main flow passage channel 20 is formed inside the front wheel valve unit 18a so as to pass through the front wheel valve unit 18a, with the first port 18a1 being one end of the main flow passage channel 20, and a second port 18a2 being the other end of the main flow passage channel 20. Two secondary flow passage channels 22 are formed inside the front wheel valve unit 18a so as to branch off from the main flow passage channel 20. One end of the vehicle height adjustment valve 14FR is connected to one of the secondary flow passage channels 22, and the other end of the vehicle height adjustment valve 14FR is connected to the air spring 12FR via a third port 18a3. Similarly, one end of the vehicle height adjustment valve 14FL is connected to the other secondary flow passage channel 22, and the other end of the vehicle height adjustment valve 14FL is connected to the air spring 12FL via a fourth port 18a4.

A main communication flow passage 16a (the main flow passage 16) is connected to the second port 18a2. The main communication flow passage 16a is connected to a first port 18b1 of the rear wheel valve unit 18b. The main flow passage channel 20 is formed inside the rear wheel valve unit 18b so as to have the first port 18b1 as one end of the main flow passage channel 20. Two secondary flow passage channels 22 are also formed inside the rear wheel valve unit 18b so as to branch off from the main flow passage channel 20. One end of the vehicle height adjustment valve 14RR is connected to one of the secondary flow passage channels 22, and the other end of the vehicle height adjustment valve 14RR is connected to the air spring 12RR via a second port 18b2. One end of the vehicle height adjustment valve 14RL is connected to the other secondary flow passage channel 22, and the other end of the vehicle height adjustment valve 14RL is connected to the air spring 12RL via a third port 18b3.

FIG. 1 illustrates an example in which the front wheel valve unit 18a adopts four ports, and the rear wheel valve unit 18b adopts three ports, but for example, the rear wheel valve unit can adopt four ports similar to the front wheel valve unit. When the rear wheel valve unit 18b adopts four ports similar to the front wheel valve unit 18a, a port corresponding to the second port 18a2 is sealed with a plug cap (blind cap). In this case, it is possible to reduce the number of the types of components, and the design costs by using a common valve unit for the front and rear wheel valve units.

The same type of opening and closing valve can be used in the vehicle height adjustment valve 14 (14FR, 14FL, 14RR, 14RL), and for example, the vehicle height adjustment valve 14 has an ON/OFF controlled solenoid and a spring. Any of the control valves can be a normally closed electro-magnetic control valve that is closed when the solenoid of the control valve is not energized.

The main flow passage 16 is connected to a pressure tank 26 (supply source of the working fluid) via a circuit valve block 24 and a tank connection main flow passage 16b. The circuit valve block 24 is connected to an outlet of a compressor unit 30 via a compressor outlet flow passage 28a. The circuit valve block 24 is connected to an inlet of the compressor unit 30 via a compressor inlet flow passage 28b. The circuit valve block 24 is formed as a valve body block that includes a plurality of the opening and closing valves, for example, four opening and closing valves. Specifically, the circuit valve block 24 includes a first opening and closing valve 24a, a second opening and closing valve 24b, a third opening and closing valve 24c, and a fourth opening and closing valve 24d. A first end of each of the first opening and closing valve 24a and the second opening and closing valve 24b are connected to the pressure tank 26 via the tank connection main flow passage 16b (the main flow passage 16). A first end of the third opening and closing valve 24c is connected to the outlet of the compressor unit 30 via the compressor outlet flow passage 28a, and is connected to a second end of the second opening and closing valve 24b. A second end of the third opening and closing valve 24c is connected to the air spring 12 (the vehicle height adjustment unit and the front wheel valve unit 18a). A first end of the fourth opening and closing valve 24d is connected to the inlet of the compressor unit 30 via the compressor inlet flow passage 28*b*, and is connected to a second end of the first opening and closing valve 24*a*. A second end of the fourth opening and closing valve 24*d* is connected to the air spring 12 (the vehicle height adjustment unit and the front wheel valve unit 18*a*).

The same type of opening and closing valve can be used in the first opening and closing valve 24*a*, the second opening and closing valve 24*b*, the third opening and closing valve 24*c*, and the fourth opening and closing valve 24*d* of the circuit valve block 24, and for example, each of the first opening and closing valve 24*a*, the second opening and closing valve 24*b*, the third opening and closing valve 24*c*, and the fourth opening and closing valve 24*d* has an ON/OFF controlled solenoid and a spring. Any of the control valves can be a normally closed electro-magnetic control valve that is closed when the solenoid of the control valve is not energized.

The vehicle height adjustment apparatus 10 of the embodiment includes a first pressure sensor 32*a* and a second pressure sensor 32*b*. In FIG. 1, for example, the first pressure sensor 32*a* is disposed upstream of the circuit valve block (the plurality of opening and closing valves) 24, and the second pressure sensor 32*b* is disposed downstream thereof. That is, the circuit valve block (valve body block) 24 includes the first pressure sensor 32*a* for detecting the pressure of the pressure tank 26, and the second pressure sensor 32*b* for detecting the pressure of the air spring 12 (the vehicle height adjustment unit and the front wheel valve unit 18*a*). For example, the circuit valve block 24 is made of metal or resin, and channels are formed inside the circuit valve block 24 so as to allow the above-mentioned connections of the first opening and closing valve 24*a*, the second opening and closing valve 24*b*, the third opening and closing valve 24*c*, and the fourth opening and closing valve 24*d*. The first pressure sensor 32*a* is connected to one of the channels, which connects the respective first ends of the first opening and closing valve 24*a* and the second opening and closing valve 24*b* and the tank connection main flow passage 16*b* (the main flow passage 16) (in FIG. 1, the first pressure sensor 32*a* is connected to a channel that extends from the first end of the first opening and closing valve 24*a*). The second pressure sensor 32*b* is connected to one of the channels, which connects the respective first ends of the third opening and closing valve 24*c* and the fourth opening and closing valve 24*d* and the main flow passage 16 (in FIG. 1, the second pressure sensor 32*b* is connected to a channel that extends from the first end of the third opening and closing valve 24*c*).

For example, when the first opening and closing valve 24*a* and the second opening and closing valve 24*b* are closed, the first pressure sensor 32*a* can accurately detect the static pressure of the pressure tank 26. When at least one of the first opening and closing valve 24*a* and the second opening and closing valve 24*b* is opened and the working fluid flows through the channel, the first pressure sensor 32*a* can detect the dynamic pressure of the pressure tank 26. Similarly, when the third opening and closing valve 24*c* and the fourth opening and closing valve 24*d* are closed, and at least one of the respective vehicle height adjustment valves 14FR and 14FL of the front wheels is opened, the second pressure sensor 32*b* can detect the static pressure of the air spring 12. When the third opening and closing valve 24*c* and the fourth opening and closing valve 24*d* are closed, the vehicle height adjustment valves 14RR and 14RL are closed, and one of the vehicle height adjustment valves 14FR and 14FL is opened, the second pressure sensor 32*b* can detect the static pressure of any one of the respective air springs 12FR and 12FL of the front wheels. When both of the vehicle height adjustment valves 14FR and 14FL are opened, the second pressure sensor 32*b* can detect an average static pressure of the air springs 12FR and 12FL. When the third opening and closing valve 24*c* and the fourth opening and closing valve 24*d* are closed, the vehicle height adjustment valves 14RR and 14RL are closed, and one of the vehicle height adjustment valves 14RR and 14RL is opened, the second pressure sensor 32*b* can detect the static pressure of any one of the respective air springs 12RR and 12RL of the rear wheels. When both of the vehicle height adjustment valves 14RR and 14RL are opened, the second pressure sensor 32*b* can detect an average static pressure of the air springs 12RR and 12RL. When the third opening and closing valve 24*c* and the fourth opening and closing valve 24*d* are closed, the vehicle height adjustment valves 14FR, 14FL, 14RR, and 14RL are opened, the second pressure sensor 32*b* can detect the static pressure of the entirety of the air springs 12FR, 12FL, 12RR, and 12RL that correspond to the entirety of the wheels, respectively. When the third opening and closing valve 24*c* or the fourth opening and closing valve 24*d* is opened, the second pressure sensor 32*b* can detect the dynamic pressure of the air spring 12 (the vehicle height adjustment unit, the front wheel valve unit 18*a*, and the rear wheel valve unit 18*b*).

As such, the first pressure sensor 32*a* can detect the pressure (static pressure or dynamic pressure) of an upstream side (for example, the pressure tank 26) of the circuit valve block 24, and the second pressure sensor 32*b* can detect the pressure (static pressure or dynamic pressure) of a downstream side (for example, the air spring 12) of the circuit valve block 24. Since the working fluid flows from the pressure tank 26 toward the air spring 12 due to a pressure difference (differential pressure) between the pressure tank 26 and the air spring 12, the vehicle height can be adjusted, which will be described later. In other words, since a small pressure difference does not allow the flow of a sufficient amount of the working fluid for the adjustment of the vehicle height, it is necessary to drive the compressor unit 30. The vehicle height adjustment apparatus 10 can acquire (calculate) a pressure difference (differential pressure) based on the detected result of the first pressure sensor 32*a* and the second pressure sensor 32*b*, and control the driving of the compressor unit 30 based on the result. For example, when a vehicle height increasing control operation is performed, and the pressure difference between the pressure tank 26 and the air spring 12 is greater than or equal to a predetermined value (threshold value), the working fluid can flow from the pressure tank 26 toward the air spring 12 due to the pressure difference. At this time, a compressor 36 can be brought into a non-drive state. In contrast, when the pressure difference between the pressure tank 26 and the air spring 12 is less than the predetermined value (threshold value), and a vehicle height increasing control operation is continuously performed, the compressor 36 can be driven at that timing (timing at which the compressor 36 is required to pressure-feed the working fluid).

For example, the pressure tank 26 is made of metal or resin, and has a capacity and pressure resistance properties that allow the pressure tank 26 to sufficiently resist against pressure occurring in a flow passage system when a vehicle height adjustment control of the air spring 12 is performed or not. The pressure tank 26 has a relief valve 26*b* that reduces the internal pressure of a tank main body 26*a* when the internal pressure is greater than or equal to a set pressure (pressure that is set in advance via testing and the like) due to an unknown reason.

The compressor unit 30 has the following main configurations: the compressor 36 driven by a motor 34; a dryer 38; and a throttle mechanism 40 including an orifice 40*a* and a check valve 40*b*. FIG. 1 illustrates an example in which the compressor unit 30 further includes a relief valve 42; check valves 44, 46, and 48; and filters 50 and 52.

When the pressure difference between the pressure tank 26 and the air spring 12 is less than or equal to a predetermined valve (value that is set in advance via testing and the like) during the execution of a vehicle height increasing control operation, or the working fluid is drawn (returns back) into the pressure tank 26 from the air spring 12 during the execution of a vehicle height decreasing control operation, the motor 34 operates the compressor 36, and the compressor unit 30 pressure-feeds the working fluid. The vehicle height adjustment apparatus 10 of the embodiment is a closed type apparatus that adjusts the vehicle height by moving the working fluid in the flow passages (air sealed in the flow passages from the very beginning when the vehicle height adjustment apparatus 10 is built) between the pressure tank 26 and the air spring 12. Accordingly, basically, external air may not intrude into the vehicle height adjustment apparatus 10, and the vehicle height adjustment apparatus 10 is not affected by environmental changes such as humidity fluctuations. Accordingly, basically, it is possible to remove the dryer 38 or the throttle mechanism 40 from the closed type apparatus. The working fluid (air) in the apparatus may leak to the outside due to an unknown reason. At this time, the apparatus supplements the working fluid therein by suctioning the atmosphere (external air) from the outside via the filter 52 and the check valve 48. At this time, the atmosphere (external air) may contain moisture (humid air) that adversely affects configuration components of the vehicle height adjustment apparatus 10. For this reason, in the vehicle height adjustment apparatus 10 illustrated in FIG. 1, the dryer 38 and the throttle mechanism 40 are provided downstream of the compressor 36. The dryer 38 removes a predetermined amount of humid air from the suctioned atmosphere, and the throttle mechanism 40 adjusts the passing through speed of the atmosphere that passes through the dryer 38. The compressor unit 30 has the relief valve 42 so as to reduce the internal pressure of the vehicle height adjustment apparatus 10 when the internal pressure exceeds a limit pressure due to an unknown reason. For example, the relief valve 42 has an ON/OFF controlled solenoid and a spring, and a normally closed electro-magnetic control valve that is closed when the solenoid is not energized can be used as the relief valve 42. The relief valve 42 of the embodiment has a check valve 54 that allows the flow of the working fluid to the outside without maintaining a closed state of the non-energized solenoid in any of the cases when the internal pressure of the vehicle height adjustment apparatus 10 exceeds the limit pressure (pressure that is set in advance via testing and the like). For example, when the internal pressure of the vehicle height adjustment apparatus 10 exceeds the limit pressure due to the occurrence of an unknown malfunction, the internal pressure opens the relief valve 42 against a biasing force of the check valve 54, and thus the internal pressure is automatically reduced below the limit pressure. The relief valve 42 can be opened based on a control signal from a control unit that will be described later, and thus can reduce the internal pressure of the vehicle height adjustment apparatus 10 regardless of the limit pressure. The compressor 36 also functions as a supply source that supplies the working fluid to the air spring 12.

In the vehicle height adjustment apparatus 10 with this configuration, a control unit (ECU) 56 of the vehicle height adjustment apparatus 10 controls the vehicle height adjustment unit (the air springs, the vehicle height adjustment valves, and the like which will be described later) to adjust the vehicle height. For example, the ECU 56 can acquire the demand for vehicle height adjustment via a controller area network (CAN); the detected result of a vehicle height sensor 58 that detects an expansion and contraction (vehicle height) state of each of the air springs 12; and the detected result of the first pressure sensor 32a and the second pressure sensor 32b. The ECU 56 controls the opening and closing of the vehicle height adjustment valves 14FR, 14FL, 14RR, 14RL, the first opening and closing valve 24a, the second opening and closing valve 24b, the third opening and closing valve 24c, the fourth opening and closing valve 24d, and the relief valve 42, or the driving of the motor 34, based on the acquired information. FIG. 1 illustrates an example in which the single ECU 56 controls each control target in an integrated manner. However, a control unit may be provided to individually control each control target, or some control units may be provided to control several control targets as a group, and an upper control unit may be provided to control the several control units in an integrated manner.

As described above, in the vehicle height adjustment apparatus 10 of the embodiment, since the first pressure sensor 32a is disposed upstream of the circuit valve block 24, and the second pressure sensor 32b is disposed downstream of the circuit valve block 24, it is possible to detect the pressure of the pressure tank 26 and the air spring 12. In particular, it is possible to detect the pressure in real time when a vehicle height increasing control operation is performed. As a result, the ECU 56 can accurately determine whether a pressure difference is sufficient enough to allow the flow of the working fluid, and when the pressure difference is insufficient, the ECU 56 can drive the compressor 36 for a necessary time period at an appropriate timing. As a result, it is possible to optimize the control of the drive of the compressor 36, perform control with lower power consumption, and reduce noise or vibration caused by the driving of the compressor 36. The first pressure sensor 32a and the second pressure sensor 32b can detect the pressure of the pressure tank 26 and the air spring 12 in real time, respectively, and the detected pressure can be reflected in the controlling of the vehicle height. For example, it is possible to smoothly adjust the vehicle height at all times by driving the compressor 36 at an appropriate timing as described above. It is possible to smoothly adjust the vehicle height in response to road surface conditions. As a result, it is possible to improve riding comfort, and maneuverability.

Since it is possible to operate the compressor 36 at an appropriate timing, for example, even when the wheels get on a curb stone, and the vehicle body inclines in a lateral direction, in practice, it is possible to maintain the vehicle body in a horizontal state by adjusting the vehicle height at the appropriate timing, and reduce the discomfort or anxiety of an occupant and the like. It is possible to maintain a force exerted (force exerted on a hinge portion) for the opening and closing of a door at the same level as when the vehicle body is in a horizontal state, and to easily open and close the door. It is possible to obtain the same level of boarding and deboarding characteristics as when the vehicle body is in a horizontal state.

The vehicle height increasing and decreasing control operations of the vehicle height adjustment apparatus 10 with this configuration will be described with reference to FIGS. 2 to 4.

First, in the following description of the operation of the vehicle height adjustment apparatus 10 with reference to FIG. 2, when a vehicle height increasing control operation is performed, the pressure of the pressure tank 26 is sufficiently higher than that of the air spring 12, and the working fluid (air) can flow from the pressure tank 26 toward the air spring 12 due to a pressure difference between the pressure tank 26 and the air spring 12. The ECU 56 acquires the pressure of the pressure tank 26 based on the detected result of the first pressure sensor 32a, and the pressure of the air spring 12 based on the detected result of the second pressure sensor 32b, calculates a pressure difference, and thus determines whether the pressure difference is sufficient enough to allow the flow of the working fluid (air).

When a vehicle height increasing adjustment control operation is performed, a vehicle height adjustment speed is preferably changed based on situations. For example, an operator may want to increase the vehicle height so as to reduce a burden on the occupant in boarding or deboarding from the vehicle. At this time, it is desirable that the increasing of the vehicle height be quickly completed in order for the occupant to be able to board and alight from the vehicle. The operator may preferably want to increase the vehicle height in response to travelling states (speed, road surface conditions, and the like) when the vehicle is travelling. At this time, the operator desirably increases the vehicle height in an increasing speed range in which the occupant is not discomfortable while a stable travelling is maintained.

When the vehicle height adjustment apparatus 10 performs a vehicle height increasing control operation, the ECU 56 controls the opening and closing of the first opening and closing valve 24a, the second opening and closing valve 24b, the third opening and closing valve 24c, and the fourth opening and closing valve 24d of the circuit valve block 24, and the opening of the vehicle height adjustment valves 14FR, 14FL, 14RR, and 14RL.

The vehicle height adjustment apparatus 10 of the embodiment can switch the flow mode (flow direction, flow rate, or the like) of the working fluid by changing the combination of the respective opening and closing states of the first opening and closing valve 24a, the second opening and closing valve 24b, the third opening and closing valve 24c, and the fourth opening and closing valve 24d of the circuit valve block 24. For example, when the working fluid flows from the pressure tank 26 toward the vehicle height adjustment unit (the air spring 12) due to a pressure difference therebetween, the ECU 56 can selectively use at least one of first and second flow passage systems. The first flow passage system is formed when the first opening and closing valve 24a and the fourth opening and closing valve 24d are opened, and the second flow passage system is formed when the second opening and closing valve 24b and the third opening and closing valve 24c are opened. For example, when the ease of flow of a first flow mode (flow passage opening diameter due to the ease of flow associated with flow resistance) of the first flow passage system is actually the same as that of a second flow mode (flow passage opening diameter due to the ease of flow associated with flow resistance) of the second flow passage system, the ECU 56 selects any one of the first and second flow passage systems. At this time, the working fluid flowing out of the pressure tank 26 via the tank connection main flow passage 16b can be supplied to the air spring 12 in a first speed mode (for example, low-speed increasing mode) while passing through the first flow passage system or the second flow passage system, the air spring 12 extends due to the opening of the vehicle height adjustment valve 14, and it is possible to increase the vehicle height at a low speed.

When the ECU 56 selects the first and second flow passage systems, the flow of the working fluid is actually two times easier compared to when the ECU 56 selects any one of the first and second flow passage systems, and the working fluid can be supplied to the air spring 12 in a second speed mode (for example, high-speed increasing mode) faster than in the first speed mode. As a result, the air spring 12 extends due to the opening of the vehicle height adjustment valve 14, and it is possible to increase the vehicle height at a higher speed compared to the first speed mode.

The ECU 56 can switch the ease of flow of the working fluid (flow rate of the working fluid) per a unit time period by selecting the first and/or second flow passage systems, and easily change the vehicle height increasing speed. In another embodiment, the first flow mode of the first flow passage system defined by the opening of the first opening and closing valve 24a and the fourth opening and closing valve 24d may be set differently from the second flow mode of the second flow passage system defined by the opening of the second opening and closing valve 24b and the third opening and closing valve 24c. For example, the opening diameter of the opening and closing valves of the first flow passage system may be different from that of the second flow passage system. As a result, when the ECU 56 opens the first opening and closing valve 24a and the fourth opening and closing valve 24d, and selects the first flow passage system, a speed mode becomes the low-speed increasing mode. When the ECU 56 opens the second opening and closing valve 24b and the third opening and closing valve 24c, and selects the second flow passage system, a speed mode becomes a medium-speed increasing mode. When the ECU 56 selects the first and second flow passage systems, a speed mode becomes the high-speed increasing mode.

The first and/or second flow passage systems may be selected multiple times during one vehicle height increasing process. For example, in an initial period of a vehicle height increasing operation, the increasing speed may be set to the first speed mode in which any one of the first flow passage system and the second flow passage system is selected. In an intermediate period, the increasing speed may be set to the second speed mode in which both of the first and second flow passage systems are selected, and which is faster than the first mode. In a final period, the increasing speed may be set to the first speed mode again. It is possible to reduce a shock at the start of the increasing of the vehicle height by starting the increasing of the vehicle height slowly in the first speed mode. It is possible to reduce a time period it takes to complete the vehicle height increasing control operation by changing a speed mode to the second speed mode in the intermediate period, in which the vehicle height is increased at a high speed. It is possible to reduce a shock at the stop of increasing of the vehicle height by switching a speed mode to the first speed mode again and increasing the vehicle height slowly in the final period.

Figure 2:
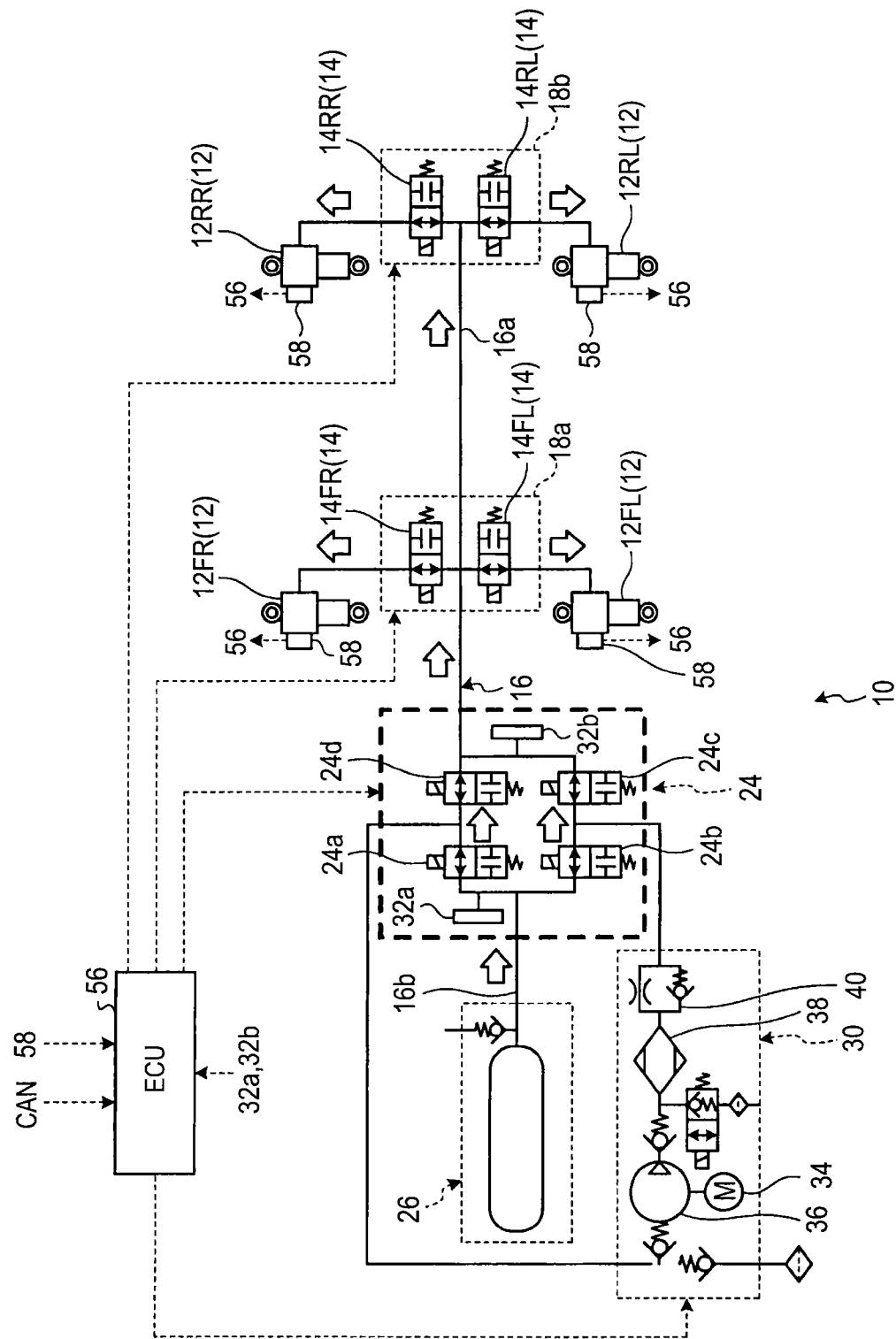
FIG. 2 is a diagram illustrating the state of opening and closing valves and the flow of the working fluid when the vehicle height adjustment apparatus of the embodiment performs a vehicle height increasing control operation without a compressor being driven.

As illustrated in FIG. 2 and the like, in the vehicle height adjustment apparatus 10 of the embodiment, the second end of the second opening and closing valve 24b and the first end of the third opening and closing valve 24c are connected to the throttle mechanism 40, and the second end of the second opening and closing valve 24b is also connected to the first end of the third opening and closing valve 24c. That is, when the working fluid flows toward the air spring 12 due to a pressure difference between the pressure tank 26 and the air spring 12, regardless of the throttle mechanism 40, that is, the compressor unit 30, the working fluid can pass through any one or both of the first flow passage system formed in the first opening and closing valve 24a and the fourth opening and closing valve 24d and the second flow passage system formed in the second opening and closing valve 24b and the third opening and closing valve 24c. In other words, when the working fluid flows due to the pressure difference, the working fluid does not pass through the compressor unit 30. Accordingly, it is possible to simplify the flow passage of the working fluid that flows due to the pressure difference, and reduce the occurrence of pressure loss during the flow of the working fluid.

In the vehicle height adjustment apparatus 10, basically, the working fluid flows toward the air spring 12 due to a pressure difference between the pressure tank 26 and the air spring 12. However, since the working fluid flows from the pressure tank 26 toward the air spring 12, the pressure difference between the pressure tank 26 and the air spring 12 may dissipate so as not to allow a sufficient flow of the working fluid. In addition, there may not be present sufficient pressure difference (differential pressure) between the pressure tank 26 and the air spring 12 when a vehicle height increasing control operation is started. At this time, the ECU 56 drives the motor 34 of the compressor unit 30, and the compressor 36 forcibly draws the working fluid from the pressure tank 26, and pressure-feeds the working fluid toward the air spring 12.

Figure 3:
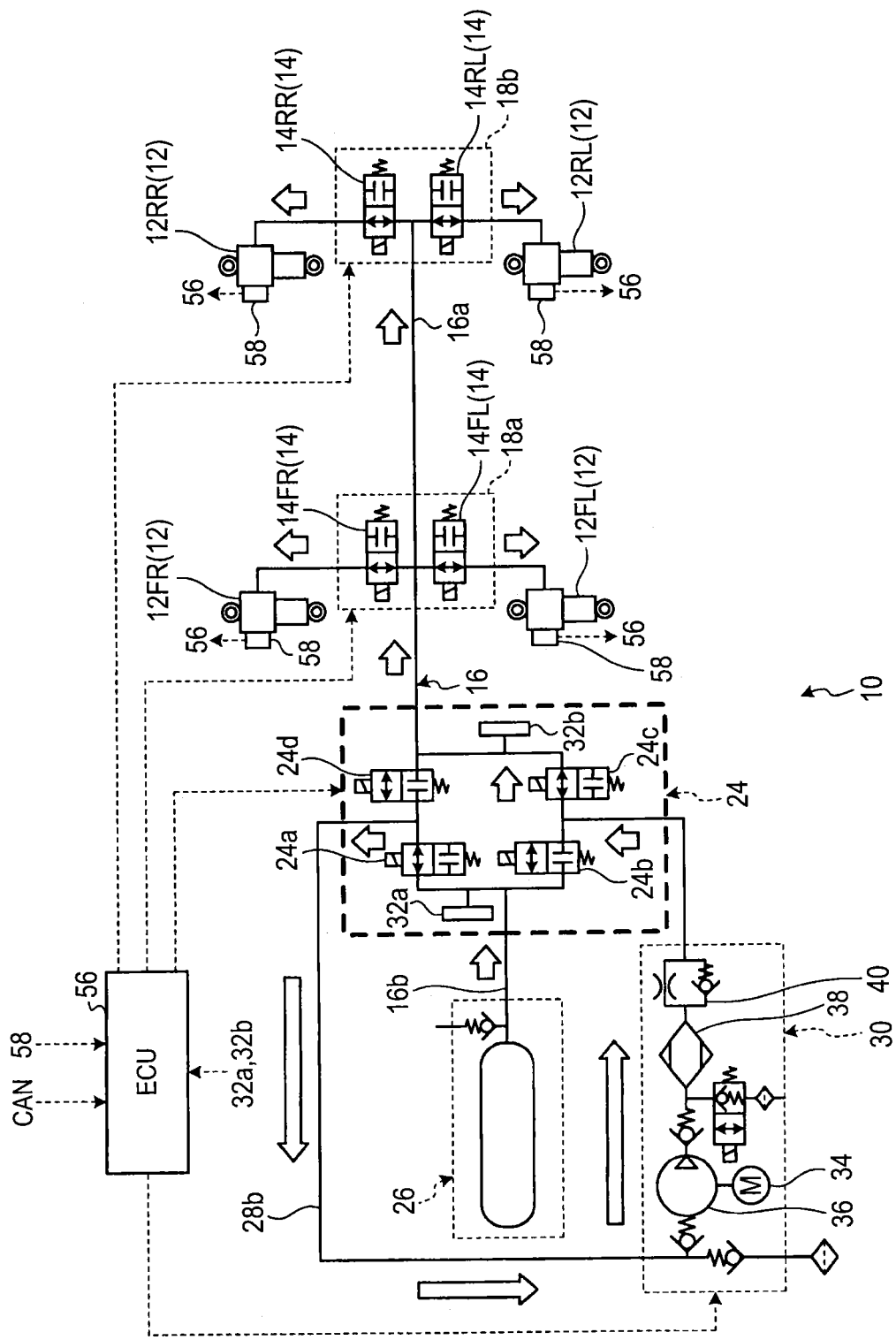
FIG. 3 is a diagram illustrating the state of opening and closing valves and the flow of the working fluid when the vehicle height adjustment apparatus of the embodiment performs a vehicle height increasing control operation with the compressor being driven.

In the operation of the vehicle height adjustment apparatus 10 illustrated in FIG. 3, when a vehicle height decreasing control operation is performed, the compressor 36 pressure-feeds the working fluid toward the air spring 12. For example, when it is determined that a pressure difference between the pressure tank 26 and the air spring 12 is less than or equal to a predetermined value, based on the detected results of the first pressure sensor 32a and the second pressure sensor 32b, the ECU 56 switches the respective opening and closing states of the first opening and closing valve 24a, the second opening and closing valve 24b, the third opening and closing valve 24c, and the fourth opening and closing valve 24d, and controls the compressor 36 to start the pressure feed of the working fluid. It is possible to determine the predetermined value for the pressure difference to trigger the switching of the opening and closing states, based on via testing carried out in advance and the like. For example, it is possible to determine a differential pressure value in such a manner that the vehicle height increasing speed becomes less than the predetermined value. At this time, it is desirable that the compressor 36 start the pressure feed of the working fluid before the increasing of the vehicle height is stopped.

In another embodiment, the compressor 36 may start the pressure feed of the working fluid based on the detected result of the vehicle height sensors 58. That is, when a pressure difference between the pressure tank 26 and the air spring 12 decreases, the vehicle height increasing speed decreases as well. Accordingly, the ECU 56 may calculate the vehicle height increasing speed by time-differentiating a vehicle height value from each of the vehicle height sensors 58, and when the vehicle height increasing speed is less than a predetermined value (low increasing speed limit determined in advance via testing and the like), the ECU 56 may control the compressor 36 to start the pressure feed of the working fluid. The ECU 56 may determine a start of driving of the compressor 36 based on the detected results of the first pressure sensor 32a and the second pressure sensor 32b and the detected result of the vehicle height sensor 58.

As illustrated in FIG. 3, when a pressure difference is less than or equal to the predetermined value based on the detected results of the first pressure sensor 32a and the second pressure sensor 32b, or when the vehicle height increasing speed is less than or equal to the predetermined value based on the detected vehicle height value of each of the vehicle height sensors 58, the ECU 56 brings the first opening and closing valve 24a into an opening state, and the fourth opening and closing valve 24d into a closing state. At this time, the pressure tank 26 and the compressor 36 are brought into communication with each other. The second opening and closing valve 24b is closed, and the third opening and closing valve 24c is opened. At this time, the compressor 36 and the air spring 12 are brought into communication with each other. As a result, the working fluid in the pressure tank 26 is drawn into the compressor 36 via the tank connection main flow passage 16b, the first opening and closing valve 24a, and the compressor inlet flow passage 28b by the driving of the compressor 36. The drawn working fluid is compressed, and pressure-fed toward the air spring 12 via the compressor outlet flow passage 28a and the third opening and closing valve 24c. As a result, the air spring 12 can be controlled to increase the vehicle height even when there is no sufficient pressure difference between the pressure tank 26 and the air spring 12. At this time, the vehicle height increasing speed is determined by the output of the compressor 36, that is, the output of the motor 34. For this reason, the ECU 56 controls the output of the motor 34 in response to a demanded vehicle height increasing speed, for example, a high-speed vehicle height increasing demand or a low-speed vehicle height increasing demand. Even when the vehicle height increasing speed is changed multiple times in one vehicle height increasing process as described above, the ECU 56 preferably controls the output of the motor 34.

When there is present a pressure difference between the pressure tank 26 and the air spring 12, but the weight of the vehicle is increased before or while a vehicle height increasing control operation is performed, for example, when the number of occupants increases, or when the amount of cargo increases, a load which the air spring 12 has to support increases, thereby contracting the air spring 12. As a result, the pressure of the air spring 12 increases, and a pressure difference (differential pressure) between the pressure tank 26 and the air spring 12 may dissipate. Even in this case, the vehicle height increasing speed decreases. It is possible to detect these conditions based on the detected values of the first pressure sensor 32a and the second pressure sensor 32b. Accordingly, the ECU 56 can control the compressor 36 to start the pressure feed of the working fluid at an appropriate timing.

Subsequently, the operation of the vehicle height adjustment apparatus 10 during the execution of a vehicle height decreasing control operation will be described with reference to FIG. 4. For example, when acquiring a vehicle height decreasing demand via the CAN, the ECU 56 switches the opening and closing states of the first opening and closing valve 24a, the second opening and closing valve 24b, the third opening and closing valve 24c, and the fourth opening and closing valve 24d. As a result, it is possible to draw the working fluid from the air spring 12, and return the working fluid back to the pressure tank 26 (pressure-feed the working fluid toward the pressure tank 26), using the compressor 36, and it is possible to contract the air spring 12, and decrease the vehicle height.

Figure 4:
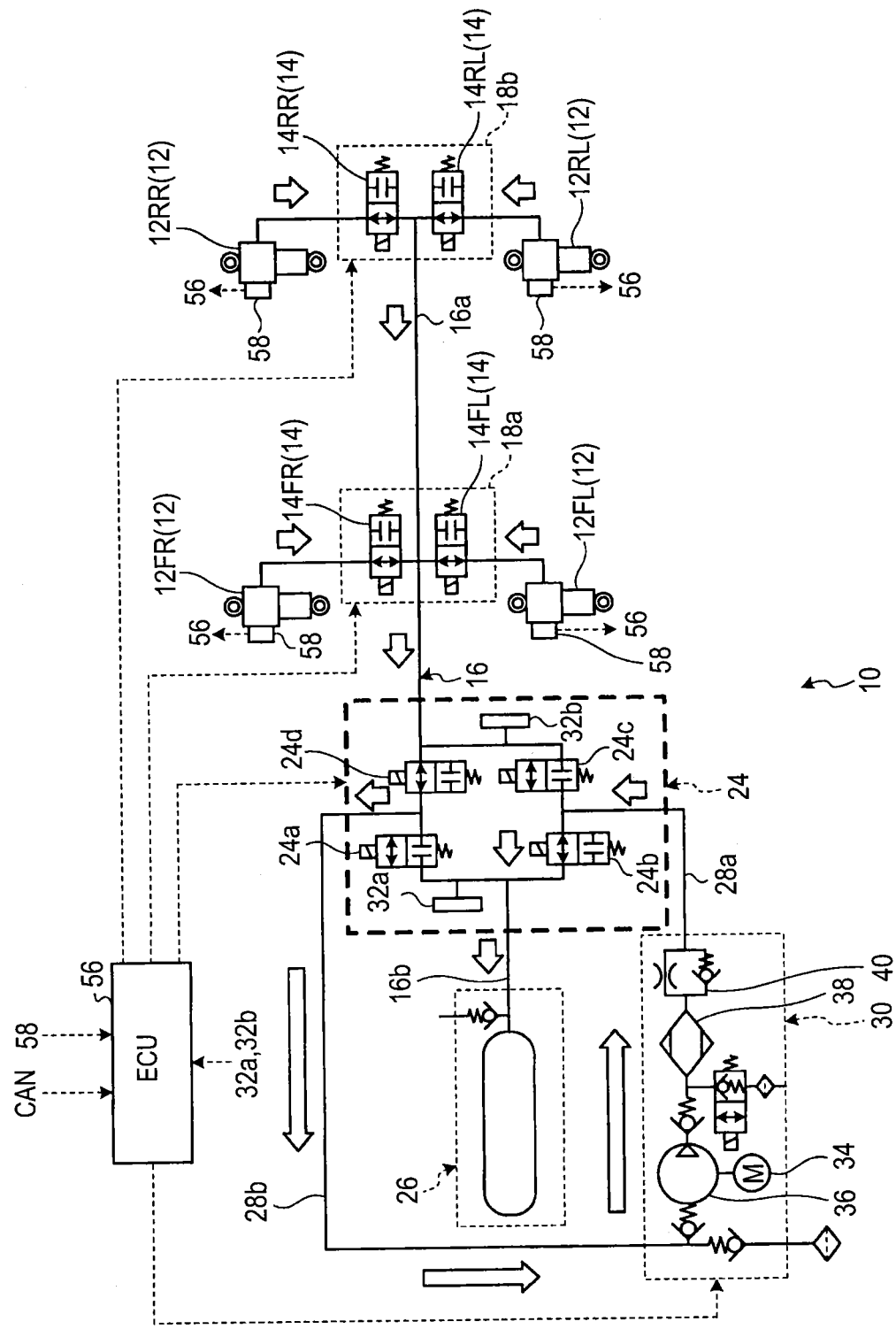
FIG. 4 is a diagram illustrating the state of opening and closing valves and the flow of the working fluid when the vehicle height adjustment apparatus of the embodiment performs a vehicle height decreasing control operation with the compressor being driven.

As illustrated in FIG. 4, when a vehicle height decreasing control operation is performed, the ECU 56 brings the first opening and closing valve 24a into a closing state, and the fourth opening and closing valve 24d into an opening state. The second opening and closing valve 24b is opened, and the third opening and closing valve 24c is maintained closed. The vehicle height adjustment valves 14FR, 14FL, 14RR, and 14RL are opened. As a result, the air spring 12 and the compressor 36 are brought into communication with each other via the fourth opening and closing valve 24d and the compressor inlet flow passage 28b. The outlet of the compressor 36 communicates with the pressure tank 26 via the compressor outlet flow passage 28a, the second opening and closing valve 24b, and the tank connection main flow passage 16b. The working fluid of the air spring 12 is drawn and pressure-fed to the pressure tank 26 by the compressor 36.

When a vehicle height decreasing control operation is performed, the vehicle height decreasing speed depends on a speed at which the working fluid is drawn by the compressor 36. That is, since the ECU 56 can arbitrarily adjust the output of the motor 34, the ECU 56 can arbitrarily select the vehicle height decreasing speed. Accordingly, the ECU 56 increases the output of the motor 34 when it is necessary to increase the vehicle height decreasing speed, and the ECU 56 decreases the output of the motor 34 when it is necessary to decrease the vehicle height decreasing speed. For example, when the occupants including a driver parks (stops) the vehicle, and move away from the vehicle, the ECU 56 may notify the occupants of the fact that the vehicle is in a resting state. At this time, it is possible to demonstrate that the vehicle comes into a resting state by itself by quickly decreasing the vehicle height lower than a normal vehicle height in a period in which the occupants including the driver stay in the vicinity of the vehicle, for example, for a few seconds after the driver turns off a drive source of the vehicle, alight from the vehicle, and lock the doors. It is possible to decrease the vehicle height in a speed range in which the occupant does not have the discomfort while a stable travelling is maintained, when stable travelling can be obtained by decreasing the vehicle height during the travelling.

The ECU 56 can adjust the amount of decreasing of the vehicle height by controlling a drive period of the compressor 36. As seen on catalogue photos, posters, or the like, typically, it is said that when the height of a vehicle is set to lower than a normal vehicle height (vehicle height generally useable for any vehicle speed, and no-load vehicle height of a vehicle equipped with a coil spring suspension), the silhouette of the vehicle is beautiful or attractive. In practice, when the vehicle height is lower than the normal vehicle height, it is difficult for a thief to insert tools under a bottom surface of the vehicle, thereby easily preventing the theft of wheels or the theft of the vehicle. The vehicle height adjustment apparatus 10 of the embodiment has a control mode in which the vehicle height adjustment apparatus 10 decreases the vehicle height to a predetermined value (storage vehicle height, low vehicle height (LO vehicle height)) after the vehicle is stopped, or when the vehicle is not used for the time being thereafter, that is, when the vehicle is in a storage state, and thereby the vehicle while stopped is more attractive or the anti-theft of the vehicle improves.

Specifically, when predetermined vehicle stop conditions are satisfied, the ECU 56 can control the air spring 12 to adjust the vehicle height in a storage vehicle height range, which is present within the vehicle height adjustable range of the air spring 12, and is set to be lower than a median of a travelling vehicle height range attainable while travelling.

For example, the predetermined vehicle stop conditions can include vehicle power source OFF information (detection of an ON-to-OFF transition of vehicle power source) acquired when the vehicle is stopped. Ignition switch OFF information, propulsion motor power source switch OFF information, or the like is a specific example of the vehicle power source OFF information. The vehicle stop conditions can include parking information (detection of an OFF-to-ON transition of a parking state) acquired when the vehicle is stopped. A specific example of the parking information includes shift information indicative of the transition of a shift position to a parking position, brake information indicative of the operation of a parking brake, or the like. The vehicle stop conditions can include door locking information (detection of the transition of a key unlocking state to a key locking state) acquired when the vehicle is stopped. For example, the door locking information may be a signal that is output from a portable key used in a so-called keyless entry or smart entry. The door locking information may be a signal that is output based on an operation state of a door cylinder or a member related to the door cylinder. The vehicle stop conditions can include decreasing-for-storage indication information (detection of an OFF-to-ON transition of a switch) acquired when the vehicle is stopped. For example, the decreasing-for-storage indication information may be the following information: a signal that is output when an occupant operates an operable switch provided in a passenger compartment; and a signal that is output when the occupant outside a vehicle operates an operable switch disposed in an outer door knob or in the vicinity of the outer door knob. Any one of the pieces of the information may be used, and a plurality of the pieces of the information may be combined for use. Information other than the decreasing-for-storage indication information is information based on an operation necessary for stopping the vehicle (putting the vehicle in a resting state) (at least a state in which the vehicle is not travelling), and it is possible to use existing systems provided in the vehicle. That is, it is not necessary to install a new detector or the like in the vehicle, and it is possible to provide the information to the ECU 56 without making a large scale of the configuration.

Here, the vehicle height adjustable range of the air spring 12 is a range that is defined by a maximum expansion state and a maximum contraction state of the air spring 12. The travelling vehicle height range attainable while travelling is present within this vehicle height adjustable range. That is, the air spring 12 includes an absorbing allowance at each of the maximum expansion and the maximum contraction so as to absorb the bounding of the vehicle while travelling, and the travelling vehicle height range is present inward of each of the absorbing allowances. In other words, when the vehicle is stopped where it is not necessary to take the absorbing of the bounding of the vehicle into consideration, it is possible to adjust the vehicle height to any position within the range defined by the maximum expansion state and the maximum contraction state of the air spring 12. For example, it is possible to set the range of the vehicle height (boarding and deboarding vehicle height) for reducing a burden on an occupant in boarding or deboarding from a vehicle or in unloading luggage within a range between the maximum expansion state and the maximum contraction state of the air spring 12, which is the same as the vehicle height adjustable range. The boarding and deboarding vehicle height for reducing a burden on an occupant in boarding and deboarding from a vehicle or in unloading luggage is different from vehicle to vehicle. That is, the ground clearance of the seat or trunk opening of a vehicle varies depending on a vehicle type. For example, in a sedan vehicle or a sport vehicle, the ground clearance of a seat or a trunk opening is relatively small, and thus the boarding and deboarding vehicle height appropriate for boarding and deboarding from the vehicle or unloading luggage is set to be greater than a normal vehicle height. In contrast, in a sport utility vehicle (SUV), the ground clearance of a seat or trunk opening is greater than that of a sedan vehicle and the like. For this reason, the boarding and deboarding vehicle height appropriate for boarding and deboarding from the vehicle or unloading luggage is set to be less than a normal vehicle height.

Since the storage vehicle height range (range set to be lower than the median of the travelling vehicle height range) is a vehicle height that is obtainable while at stop, it is not necessary to take the absorbing of the bounding of the vehicle into consideration. For this reason, it is possible to set a low limit value of the storage vehicle height range to a value of the maximum contraction of the air spring 12.

As described above, the silhouette of the vehicle is attractive when the vehicle has a low the vehicle height. For example, in a vehicle equipped with the vehicle height adjustment apparatus that adjusts the vehicle height in response to a vehicle speed, the vehicle may be attractive when travelling at high speed while being positioned at a minimum vehicle height. Accordingly, when the attractiveness of silhouette of the vehicle takes priority over the anti-theft aspect of the vehicle, the storage vehicle height may be set to a low limit value of the travelling vehicle height range. As described above, when the anti-theft of the vehicle takes priority over the attractiveness of the vehicle, it is possible to set the storage vehicle height to a low limit value of the vehicle height adjustable range, that is, a vehicle height value at the maximum contraction of the air spring 12.

When the predetermined vehicle stop condition is satisfied in this manner, the ECU 56 adjusts the vehicle height for the air spring 12 to any position (storage vehicle height) in the storage vehicle height range, and thus it is possible to broaden the useable range of the vehicle height adjustment apparatus 10, and improve the added value of the vehicle. When the ECU 56 acquires the vehicle power source ON information, the parking release information, the door unlocking information, the decreasing-for-storage indication release information, or the like, it is preferable that the vehicle height for the air spring 12 return from the storage vehicle height to any vehicle height in the travelling vehicle height range, for example, to the normal vehicle height. That is, it is preferable that the vehicle height return to a vehicle height at which the vehicle can start travelling quickly.

A control value for the storage vehicle height may be a fixed value that is determined at a design stage in response to the type of a vehicle, and may be variable in response to the preference of the occupant. For example, it may be possible to continuously or intermittently select the control value for the storage vehicle height using a volume switch, a selector switch, or the like. As described above, since the storage vehicle height is lower than the normal vehicle height, when the vehicle height is adjusted to the storage vehicle height in a state where there is present a protrusion or the like under the bottom surface of the vehicle, the protrusion or the like may be in contact with the bottom surface of the vehicle, and damage the vehicle. Accordingly, it is preferable that the vehicle height be transited to the storage vehicle height when the vehicle is stopped on a flat road on which there is a low chance of a protrusion or the like being present. For example, road conditions or conditions of the surroundings of the vehicle may be detected, and the vehicle height may be adjusted to the storage vehicle height when there is no obstacle to decreasing the vehicle height. When there is an obstacle to decreasing the vehicle height, the ECU 56 may output a control signal for outputting an alarm or a message.

When the vehicle height is adjusted to the storage vehicle height in a case where the vehicle is stopped on a substantially flat road, the ECU 56 may adjust the respective air springs 12 of the four wheels equally (may concurrently adjust the entirety of the air springs 12 to the same expansion and contraction states) in such a manner that the vehicle is parallel with a road surface. In another embodiment, the air springs 12 may be individually controlled in response to road surface conditions (states of concavity and convexity) in such a manner that a clearance between the road surface and the bottom surface of the vehicle is equal. Since the clearance between the bottom surface of the vehicle and the road surface can be adjusted to be equal in any cases, it is possible to improve the attractiveness of the vehicle or the anti-theft of the vehicle.

Figure 5:
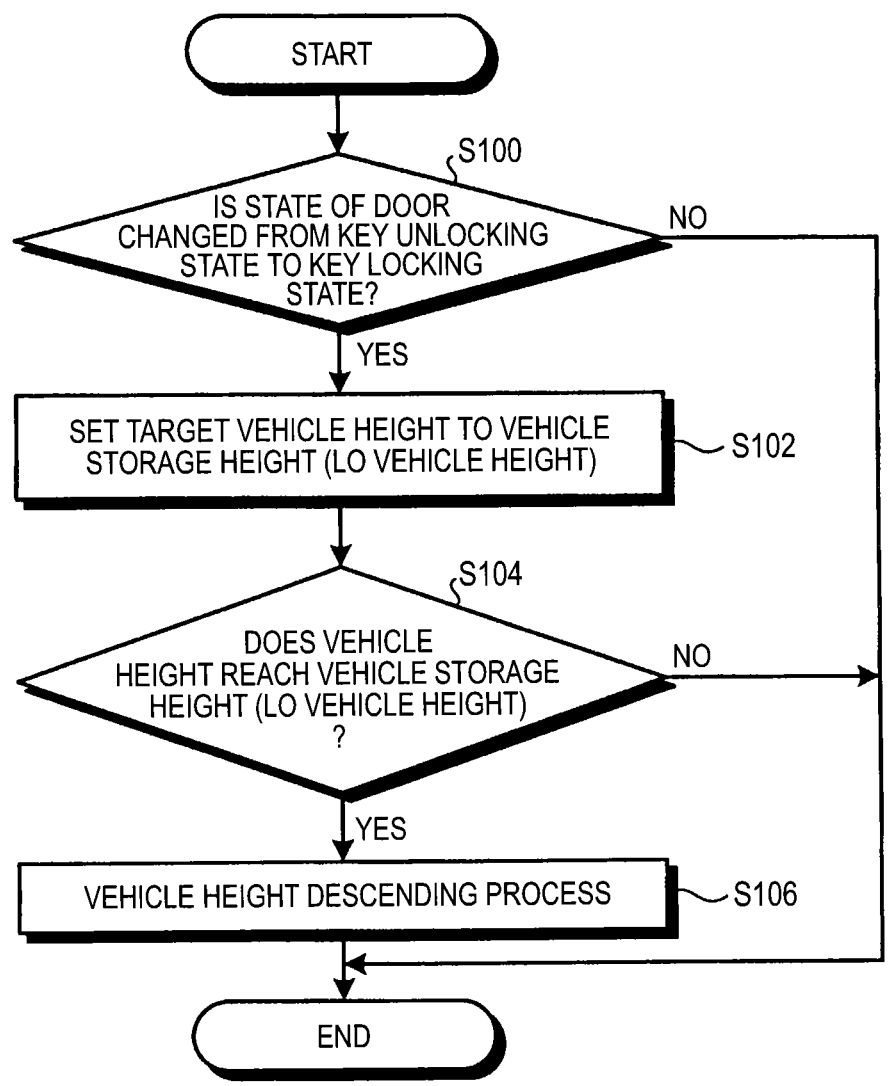
FIG. 5 is a flowchart illustrating how the vehicle height adjustment apparatus of the embodiment controls the adjustment of the vehicle height to a storage vehicle height.

A control of adjusting the vehicle height to the storage vehicle height will be described with reference to a flowchart in FIG. 5 and a timing chart of FIG. 6.

The ECU 56 confirms whether a predetermined vehicle stop condition is satisfied for each predetermined control period. For example, in a case where the vehicle stop condition is the door locking information, the ECU 56 confirms whether the transition of the key unlocking state to the key locking state is detected. When the ECU 56 can detect the transition of the key unlocking state to the key locking state (Y in S100), for example, when the ECU 56 acquires a key locking signal pulse as illustrated in the timing chart of FIG. 6, the ECU 56 sets a target height to the storage vehicle height (LO vehicle height), that is, a vehicle height lower than the normal vehicle height, with respect to the air spring 12 (S102). In the timing chart of FIG. 6, upon the key locking signal pulse being acquired, the setting of the target vehicle height is switched from the normal vehicle height (N) to the storage vehicle height (LO). In addition, upon the normal vehicle height being switched to the storage vehicle height (LO), an actual vehicle height decreases from the normal vehicle height (N) to the storage vehicle height (LO).

When the air spring 12 does not reach the storage vehicle height (LO vehicle height) (Y in S104), the ECU 56 controls the compressor 36 to draw the working fluid from the air spring 12, and returns the working fluid to the pressure tank 26. That is, the ECU 56 performs a vehicle height adjustment process in which the vehicle height decreases toward the storage vehicle height due to the contraction of the air spring 12 (S106). This process is repeated until the actual vehicle height reaches the set storage vehicle height, and when the actual vehicle height reaches the storage vehicle height, the ECU 56 ends this flow. When the vehicle height is adjusted to the storage vehicle height, the opening and closing valves are controlled as illustrated in FIG. 4.

When the ECU 56 cannot confirm that the predetermined vehicle stop condition (door locking information) is satisfied in S100 (N in S100), the ECU 56 ends this flow. When the vehicle height already reaches the storage vehicle height (LO vehicle height) in S104 (N in S104), the ECU 56 ends this flow.

As such, it is possible to make the vehicle at stop attractive by decreasing and adjusting the vehicle height to any storage position in the storage vehicle height range set to be lower than the center value of the travelling vehicle height range after the vehicle is stopped. When the vehicle height is set to be lower than the normal vehicle height, it is difficult for a thief to insert tools under the bottom surface of the vehicle, and thus the theft of wheels or the theft of the vehicle can be prevented. As a result, the vehicle height adjustment apparatus 10 of the embodiment broadens the useable range thereof by the provision of a new use in addition to the function of the vehicle height adjustment for improving travelling stability and reducing a burden on the occupant in boarding and alighting in the related art, and improves the added value of the vehicle.

Figure 6:
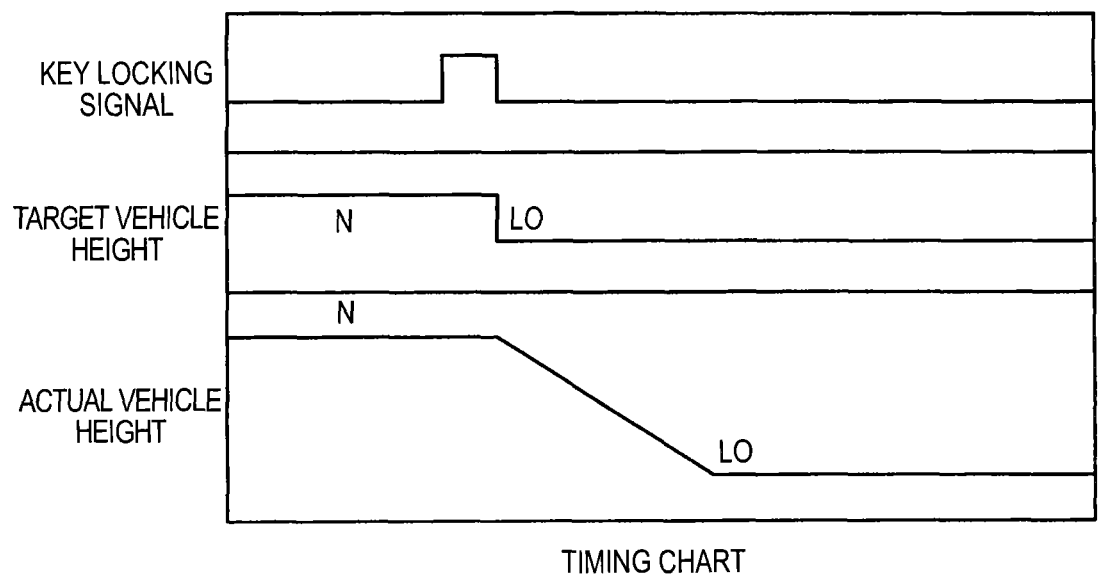
FIG. 6 is a timing chart illustrating when the vehicle height adjustment apparatus of the embodiment adjusts the vehicle height to the storage vehicle height.

The timing chart in FIG. 6 illustrates an example in which when the key locking signal pulse is acquired, and the target height is set to the storage vehicle height (LO vehicle height), the actual vehicle height is adjusted to the storage vehicle height (LO). In another embodiment, after the key locking signal pulse is acquired, or after the target vehicle height is set to the storage vehicle height (LO vehicle height), a predetermined period (for example, 10 seconds) elapses, and then the actual vehicle height may be adjusted to the storage vehicle height (LO). In this case, it is possible to demonstrate that the vehicle comes into a resting state by itself after the vehicle is stopped or parked. It is possible to increase the amusement of the occupant due to the motion of the vehicle, and use the adjustment mode as an appealing feature of a futuristic vehicle.

In the example of the above-mentioned embodiment, the storage vehicle height is set to any position in the storage vehicle height range, but a plurality of the storage vehicle heights may be set. An attractiveness priority mode and a theft prevention priority mode may be provided. The storage vehicle height in the theft prevention priority mode is set to be lower further than that of the attractiveness priority mode. For example, when the vehicle is parked or stopped in a busy place during the daytime during which there is a low chance of the vehicle being stolen, the storage vehicle height may be set to a low vehicle height limit of the travelling vehicle height range. The low vehicle height limit of the travelling vehicle height range is a vehicle height at which it is possible to replicate the silhouette of the vehicle while travelling at a high speed, and at this low vehicle height limit, it is possible to improve the attractiveness of the vehicle. The vehicle can travel at the vehicle height set in the attractiveness priority mode, and in contrast, since it is difficult or impossible for the vehicle to travel in the theft prevention priority mode in which the vehicle height is set to be lower than that in the attractiveness priority mode, it is possible to improve the theft prevention aspect. It may be possible for a user (occupant or the like) to appropriately and selectively determine the storage vehicle height in the attractiveness priority mode and the theft prevention priority mode. For example, in the attractiveness priority mode, it may be possible to set the storage vehicle height to a vehicle height at which the vehicle is considered to be more attractive by the preference of the user.

As illustrated in FIGS. 1 and 2, since the vehicle height adjustment apparatus 10 can select at least one of the first and second flow passage systems, for example, when the vehicle height returns from the storage vehicle height to the normal vehicle height, an adjustment speed is easily selected. In particular, when both of the first and second flow passage systems are selected, a high-speed adjustment is obtainable, and the vehicle can be more fun to drive due to the swift motion of the vehicle. It is possible to improve the added value of the vehicle height adjustment apparatus 10 even in this point.

The vehicle height adjustment apparatus 10 of the embodiment includes a total of four of the first opening and closing valve 24a, the second opening and closing valve 24b, the third opening and closing valve 24c, and the fourth opening and closing valve 24d, and switches the flow passage of the working fluid. As illustrated in FIGS. 1 to 4, each of the first opening and closing valve 24a, the second opening and closing valve 24b, the third opening and closing valve 24c, and the fourth opening and closing valve 24d can adopt a two-port opening and closing valve that has a simple configuration and is relatively cheap. As illustrated in FIGS. 2 to 4, it is possible to switch the flow mode (flow passage or flow direction) of the working fluid by changing the combination of the respective opening and closing states of the first opening and closing valve 24a, the second opening and closing valve 24b, the third opening and closing valve 24c, and the fourth opening and closing valve 24d, and obtain a cost reduction or a simplified design of the flow passage.

The embodiment illustrates the example in which when the vehicle height increasing control operation is performed, the ECU 56 selects at least one of the first and second flow passage systems, the first flow passage system being formed when the first opening and closing valve 24a and the fourth opening and closing valve 24d are opened, and the second flow passage system being formed when the second opening and closing valve 24b and the third opening and closing valve 24c are opened. In another embodiment, when the vehicle height increasing control operation is performed, the ECU 56 may use both of the first and second flow passage systems at all times. At this time, it is possible to improve the easiness of flow of the working fluid, increase the vehicle height increasing speed compared to the case in which any one of the first and second flow passage systems is selected, and quickly adjust the vehicle height. It is not necessary to selectively control the opening and closing valves of the circuit valve block 24 when the vehicle height increasing control operation is performed, and a control logic becomes simplified.

In the example illustrated in each of the embodiments, when the vehicle height adjustment control operation (increasing control operation or decreasing control operation) is performed, the vehicle height adjustment apparatus 10 increases or decreases the air springs 12 simultaneously, but the air springs 12 may be adjusted by individually controlling the respective vehicle height adjustment valves 14. For example, when the working fluid is supplied with the rear wheel valve unit 18b being closed and the front wheel valve unit 18a being opened, it is possible to adjust the vehicle height for only the front wheels via the respective air springs 12FR and 12FL of the front wheels. Similarly, when the working fluid is supplied with the front wheel valve unit 18a being closed and the rear wheel valve unit 18b being opened, it is possible to adjust the vehicle height for only the rear wheels via the respective air springs 12RR and 12RL of the rear wheels. When the working fluid is supplied with the vehicle height adjustment valves 14FR and 14RR being opened and the vehicle height adjustment valves 14FL and 14RL being closed, it is possible to adjust the vehicle height for only the respective air springs 12FR and 12RR of the right wheels. In contrast, when the working fluid is supplied with the vehicle height adjustment valves 14FL and 14RL being opened and the vehicle height adjustment valves 14FR and 14RR being closed, it is possible to adjust the vehicle height for only the respective air springs 12FL and 12RL of the left wheels. Even at this time, since it is possible to adjust the vehicle height adjustment speed by the selection of the first flow passage system and/or the second flow passage system of the circuit valve block 24, it is possible to obtain the same effects as when the vehicle height is simultaneously adjusted for the four wheels.

The embodiment illustrates the closed type vehicle height adjustment apparatus 10. However, this disclosure can also be applied to substantially the same apparatus, for example, an apparatus that suctions the atmosphere (external air), compresses the atmosphere using the compressor 36, and supplies the atmosphere to the air spring 12 via the pressure tank 26, and it is possible to obtain the same effects. This disclosure can be applied to an apparatus that supplies the working fluid from the compressor 36 to the air spring 12 without passing through the pressure tank 26, and it is possible to obtain the same effects.

An aspect of this disclosure is directed to a vehicle height adjustment apparatus including: a plurality of vehicle height adjustment units that are respectively provided to correspond to wheels of a vehicle body, and adjust a vehicle height in response to the supply and discharge of a working fluid; a supply source of the working fluid; a plurality of opening and closing valves that are interposed between the vehicle height adjustment units and the supply source; and a control unit that adjusts the vehicle height for the vehicle height adjustment unit in a storage vehicle height range which is present within a vehicle height adjustable range of the vehicle height adjustment unit, and is set to be lower than a center value of a travelling vehicle height range attainable while travelling. When a predetermined vehicle stop condition is satisfied, the control unit adjusts the vehicle height for the vehicle height adjustment unit to any position in the storage vehicle height range. According to this embodiment, after a vehicle is stopped, the vehicle height adjustment apparatus adjusts the vehicle height to any position in the storage vehicle height range that is set to be lower than the center value of the travelling vehicle height range. It is possible to make the vehicle at stop attractive, and prevent the theft of the wheels or the theft of the vehicle by decreasing the vehicle height. As a result, it is possible to broaden the useable range of the vehicle height adjustment apparatus, and improve the added value of the vehicle.

In the vehicle height adjustment apparatus according to the aspect of this disclosure, the storage vehicle height range may be less than or equal to a low limit value of the vehicle height range attainable while travelling. According to the aspect of this disclosure, since it is difficult for the vehicle to travel, the theft of the wheels or the theft of the vehicle is further prevented. As a result, it is possible to improve the security of the vehicle and the value of the vehicle.

In the vehicle height adjustment apparatus according to the aspect of this disclosure, when the control unit acquires at least one of vehicle power source OFF information, parking information, door locking information, and decreasing-for-storage indication information at a stop of a vehicle, the control unit may consider that the predetermined vehicle stop condition is satisfied. According to the aspect of this disclosure, it is possible to quickly transit the vehicle into a vehicle storage state.

In the vehicle height adjustment apparatus according to the aspect of this disclosure, after the predetermined vehicle stop condition is satisfied, and then a predetermined period elapses, the control unit may adjust the vehicle height for the vehicle height adjustment unit to any position in the storage vehicle height range. According to the aspect of this disclosure, when an occupant moves away from the vehicle, it is possible to demonstrate that the vehicle is automatically transited into a vehicle storage state, and increase the amusement of the occupant due to the motion of the vehicle.

In the vehicle height adjustment apparatus according to the aspect of this disclosure, the supply source may include a pressure tank that stores the working fluid, and a compressor that pressure-feeds the working fluid. The plurality of opening and closing valves may include first and second opening and closing valves, a first end of which is connected to the pressure tank; a third opening and closing valve, a first end of which is connected to an outlet of the compressor and a second end of the second opening and closing valve, and a second end of which is connected to the vehicle height adjustment unit; and a fourth opening and closing valve, a first end of which is connected to an inlet of the compressor and a second end of the first opening and closing valve, and a second end of which is connected to the vehicle height adjustment unit. When the working fluid flows from the pressure tank toward the vehicle height adjustment unit due to a pressure difference therebetween, the control unit may select at least one of a first flow passage system that is formed when the first and fourth opening and closing valves are opened, and a second flow passage system that is formed when the second and third opening and closing valves are opened. According to the aspect of this disclosure, the useable range of the vehicle height adjustment apparatus is broadened, and the added value of the vehicle improves. It is possible to switch the easiness of flow of the working fluid (flow rate of the working fluid) per a unit time period by selecting the first flow passage system or the second flow passage system, or selecting both of the first and second flow passage systems when the vehicle height increasing control operation is performed. It is possible to increase and decrease a vehicle height increasing speed or switch the vehicle height increasing speed by switching the opening and closing states of the opening and closing valves.

In the vehicle height adjustment apparatus according to the aspect of this disclosure, the supply source may include a pressure tank that stores the working fluid, and a compressor that pressure-feeds the working fluid. The plurality of opening and closing valves may include first and second opening and closing valves, a first end of which is connected to the pressure tank; a third opening and closing valve, a first end of which is connected to an outlet of the compressor and a second end of a second opening and closing valve, and a second end of which is connected to the vehicle height adjustment unit; and a fourth opening and closing valve, a first end of which is connected to an inlet of the compressor and a second end of the first opening and closing valve, and a second end of which is connected to the vehicle height adjustment unit. When the working fluid flows from the pressure tank toward the vehicle height adjustment unit due to a pressure difference therebetween, the control unit may use a first flow passage system that is formed when the first and fourth opening and closing valves are opened, and a second flow passage system that is formed when the second and third opening and closing valves are opened. According to the aspect of this disclosure, the useable range of the vehicle height adjustment apparatus is broadened, and the added value of the vehicle improves. It is possible to improve the easiness of flow of the working fluid (flow rate of the working fluid) per a unit time period, and quickly perform the vehicle height increasing control operation by using both of the first and second flow passage systems when the vehicle height increasing control operation is performed.

In the vehicle height adjustment apparatus according to the aspect of this disclosure, a fluid regeneration apparatus and a throttle mechanism may be disposed at the outlet of the compressor, and the first end of the second opening and closing valve may be connected to the first end of the third opening and closing valve, and the throttle mechanism. According to the aspect of this disclosure, the useable range of the vehicle height adjustment apparatus is broadened, and the added value of the vehicle improves. Even in a case where the fluid regeneration apparatus is disposed in the flow passage to maintain the quality of the working fluid, when the working fluid flows from the pressure tank toward the vehicle height adjustment unit due to a pressure difference therebetween, the working fluid can flow from the second opening and closing valve toward the third opening and closing valve without passing through the fluid regeneration apparatus and the throttle mechanism at the outlet of the compressor which is one of the causes of pressure loss. As a result, it is possible to prevent a decrease in the vehicle height adjustment speed.

The embodiment and modification examples of this disclosure are described, but are presented just as examples, and are not intended to limit the scope of this disclosure. This new embodiment can be implemented in various forms, and omission, replacement, and changes can be made to this disclosure in various forms insofar as the omission, the replacement, and the changes do not depart from the scope of this disclosure. The embodiment or the modifications are included in the scope or the essentials of this disclosure, and included in this disclosure disclosed in the claims and the equivalent range thereof.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle height adjustment apparatus comprising:
    a plurality of vehicle height adjustment units that are respectively provided to correspond to wheels of a vehicle body, and adjust a vehicle height in response to the supply and discharge of a working fluid;
    a supply source of the working fluid;
    a plurality of opening and closing valves that are interposed between the vehicle height adjustment units and the supply source; and
    a control unit that adjusts the vehicle height for the vehicle height adjustment unit in a storage vehicle height range which is present within a vehicle height adjustable range of the vehicle height adjustment unit, and is set to be lower than a center value of a travelling vehicle height range attainable while travelling,
    wherein when a predetermined vehicle stop condition is satisfied, the control unit adjusts the vehicle height for the vehicle height adjustment unit to any position in the storage vehicle height range, and
    wherein the storage vehicle height range is less than or equal to a low limit value of the vehicle height range attainable while travelling.

2. The vehicle height adjustment apparatus according to claim 1,
    wherein when the control unit acquires at least one of vehicle power source OFF information, parking information, door locking information, and decreasing-for-storage indication information at a stop of a vehicle, the control unit considers that the predetermined vehicle stop condition is satisfied.

3. The vehicle height adjustment apparatus according to claim 1,
    wherein after the predetermined vehicle stop condition is satisfied, and then a predetermined period elapses, the control unit adjusts the vehicle height for the vehicle height adjustment unit to any position in the storage vehicle height range.

4. The vehicle height adjustment apparatus according to claim 1,
    wherein the supply source includes a pressure tank that stores the working fluid, and a compressor that pressure-feeds the working fluid,
    the plurality of opening and closing valves includes first and second opening and closing valves, a first end of which is connected to the pressure tank; a third opening and closing valve, a first end of which is connected to an outlet of the compressor and a second end of the second opening and closing valve and a second end of which is connected to the vehicle height adjustment unit; and a fourth opening and closing valve, a first end of which is connected to an inlet of the compressor and a second end of the first opening and closing valve, and a second end of which is connected to the vehicle height adjustment unit, and
    when the working fluid flows from the pressure tank to the vehicle height adjustment unit due to a pressure difference therebetween, the control unit selects at least one of a first flow passage system that is formed when the first and fourth opening and closing valves are opened, and a second flow passage system that is formed when the second and third opening and closing valves are opened.

5. The vehicle height adjustment apparatus according to claim 1,
    wherein the supply source includes a pressure tank that stores the working fluid, and a compressor that pressure-feeds the working fluid,
    the plurality of opening and closing valves includes first and second opening and closing valves, a first end of which is connected to the pressure tank; a third opening and closing valve, a first end of which is connected to an outlet of the compressor and a second end of the second opening and closing valve, and a second end of which is connected to the vehicle height adjustment unit; and a fourth opening and closing valve, a first end of which is connected to an inlet of the compressor and a second end of the first opening and closing valve, and a second end of which is connected to the vehicle height adjustment unit, and
    when the working fluid flows from the pressure tank toward the vehicle height adjustment unit due to a pressure difference therebetween, the control unit uses a first flow passage system that is formed when the first and fourth opening and closing valves are opened, and a second flow passage system that is formed when the second and third opening and closing valves are opened.

6. The vehicle height adjustment apparatus according to claim 4,
    wherein a fluid regeneration apparatus and a throttle mechanism are disposed at the outlet of the compressor, and the first end of the second opening and closing valve is connected to the first end of the third opening and closing valve, and the throttle mechanism.

7. The vehicle height adjustment apparatus according to claim 1, wherein the vehicle height range attainable while traveling is defined by respective absorbing allowances of the plurality of vehicle height adjustment units, and
    wherein the storage vehicle height range is less than the low limit value of the vehicle height range attainable while travelling.

8. The vehicle height adjustment apparatus according to claim 7, wherein the storage vehicle height is a maximum contraction of the plurality of vehicle height adjustment units.

* * * * *